United States Patent
Parry-Jones et al.

(10) Patent No.: US 6,378,927 B1
(45) Date of Patent: Apr. 30, 2002

(54) STOWABLE LOAD RAMP FOR VEHICLES

(75) Inventors: Richard Parry-Jones, Ann Arbor; David L. Payne, Plymouth; Daniel Rodriguez, Farmnington Hills; Norman William Fasecas, Westland; Robert J. Garby, Northville, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/697,851

(22) Filed: Oct. 27, 2000

(51) Int. Cl.$^7$ ............................................... B62D 33/03
(52) U.S. Cl. ........................................ 296/61; 414/537
(58) Field of Search ...................... 296/61, 63; 414/537

(56) References Cited

U.S. PATENT DOCUMENTS

| | | | |
|---|---|---|---|
| 3,874,527 A | * | 4/1975 | Royce ....................... 296/61 X |
| 3,976,209 A | * | 8/1976 | Burton ....................... 296/61 X |
| 4,624,619 A | | 11/1986 | Uher |
| 4,944,546 A | * | 7/1990 | Keller ......................... 296/61 |
| 5,244,355 A | | 9/1993 | John |
| 5,273,335 A | | 12/1993 | Belnap |
| 5,312,148 A | * | 5/1994 | Morgan ........................ 296/61 |
| 5,312,149 A | | 5/1994 | Boone |
| 5,468,114 A | * | 11/1995 | Hickerson ................. 296/61 X |
| 5,533,771 A | * | 7/1996 | Taylor et al. ............. 296/61 X |
| 5,540,474 A | * | 7/1996 | Holland ....................... 296/61 |
| 5,752,800 A | * | 5/1998 | Brincks et al. ........... 296/61 X |
| 5,791,717 A | * | 8/1998 | Reich et al. .................. 296/61 |
| 5,907,276 A | | 5/1999 | Lance |
| 5,918,925 A | | 7/1999 | Perrin |
| 5,988,725 A | * | 11/1999 | Cole ........................... 296/61 |
| 6,068,324 A | * | 5/2000 | DeKlotz ................... 296/61 X |
| 6,120,081 A | * | 9/2000 | Collins ....................... 296/61 |
| 6,135,532 A | * | 10/2000 | Martin ........................ 296/61 |

\* cited by examiner

Primary Examiner—Joseph D. Pape
(74) Attorney, Agent, or Firm—Gigette Bejin

(57) ABSTRACT

A stowable load ramp for a vehicle includes a tailgate operable between a closed vertical position and an open horizontal position, an upper panel hingedly attached to the tailgate, a lower panel hingedly attached to the upper panel, and wherein the upper and lower panels are operable between a stowed horizontal position and an extended downwardly angled ramp position.

11 Claims, 2 Drawing Sheets

STOWABLE LOAD RAMP FOR VEHICLES

FIELD OF THE INVENTION

The present invention relates to load ramps, and more specifically, to a stowable load ramp for vehicles.

BACKGROUND OF THE INVENTION

It is common in the use of automotive vehicles, particularly sport utility vehicles and the like, to move large and heavy loads into the cargo area of the vehicle. In these situations, it is problematic loading and unloading such cargo. Ramps are useful in these situations, as they serve to provide an incline upon which to slide or roll the load into the cargo area.

In the past, ramps have been separate external devices that require transport and storage elsewhere when not in use, or they have functioned in such a way that they served as the tailgate itself. Other disadvantages of ramps used in the past include excessive weight in order to achieve the necessary load strength, bulkiness in that the ramp is not sufficiently compact in order to take up little space, or it is designed to handle only lightweight loads.

It would therefore be beneficial to have a ramp that is connected to and stowable in the vehicle while still maintaining the use of a traditional tailgate. It is also beneficial that the ramp be compact so as not to use potential cargo space, and be easy to use so as to be operable by a single person.

It is therefore desired to have a ramp wherein the tailgate is used as an integral part of the ramp in vehicles where a suitable ramp angle cannot be achieved with the ramp itself. In order to minimize storage space, it is also desired to coat the ramp with a textured finish wherein it performs a dual function as an interior trim panel in its stowed position.

SUMMARY OF THE INVENTION

It is an object of the present invention to provide a vehicle having a stowable load ramp that overcomes the disadvantages of the prior art.

It is a feature of the present invention that when the tailgate is in the horizontal position, the ramp's lower panel may be raised and locked into a position such that it functions as a seat back, as well as having foldable legs that allow the fully extended ramp to function as a table or work surface at the rear of the vehicle.

The present invention advantageously provides a stowable load ramp for a vehicle having a tailgate operable between a closed vertical position and an open horizontal position, an upper panel hingedly attached to the tailgate, a lower panel hingedly attached to the upper panel, and wherein the upper and lower panels are operable between a stowed horizontal position and an extended downwardly angled ramp position.

BRIEF DESCRIPTION OF THE DRAWINGS

These and other objects, features, and advantages of the present invention will become apparent from a reading of the following detailed description with reference to the accompanying drawings, in which.

DESCRIPTION OF THE PREFERRED EMBODIMENT(S)

Figure 1:
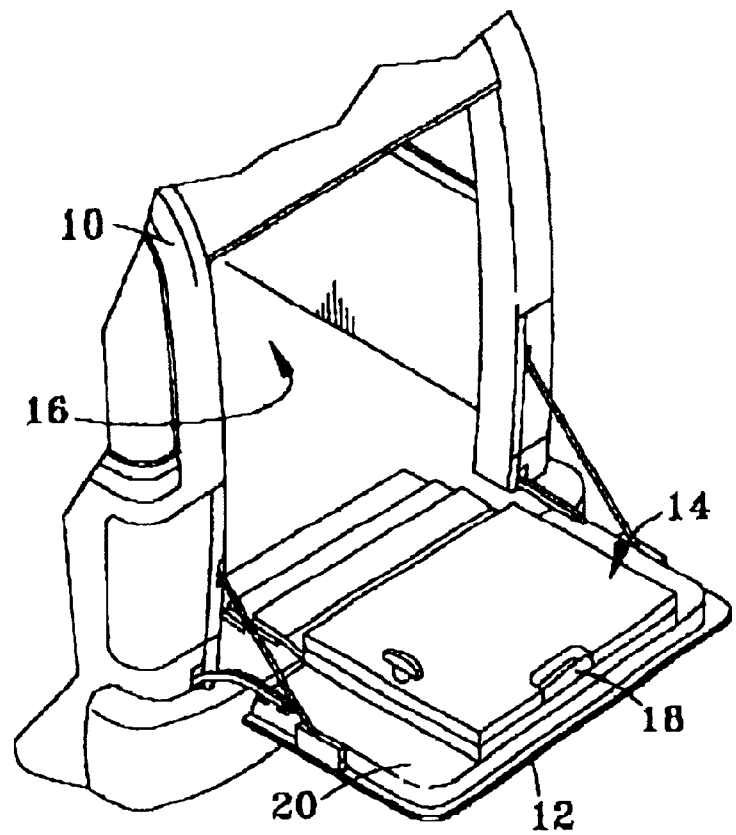
FIG. 1 is a perspective view of a vehicle tailgate in the horizontal position with the stowable load ramp in the stowed position according to the present invention.

Referring to FIG. 1, a vehicle 10 has a cargo area 16 accessible via a tailgate 12 operable between a closed vertical position and an open horizontal position. The stowable load ramp 14 has a textured visible surface, so as to serve as the interior trim panel of the tailgate 12 when in the stowed position. The stowable load ramp 14 has a handle 18 in which to assist the operator in fully extending the ramp 14. The stowable load ramp 14 is connected to an inner surface 20 of the tailgate 12 and is substantially flush with the cargo bed when the tailgate 12 is in the horizontal position and the ramp 14 is in the stowed position.

Figure 2:
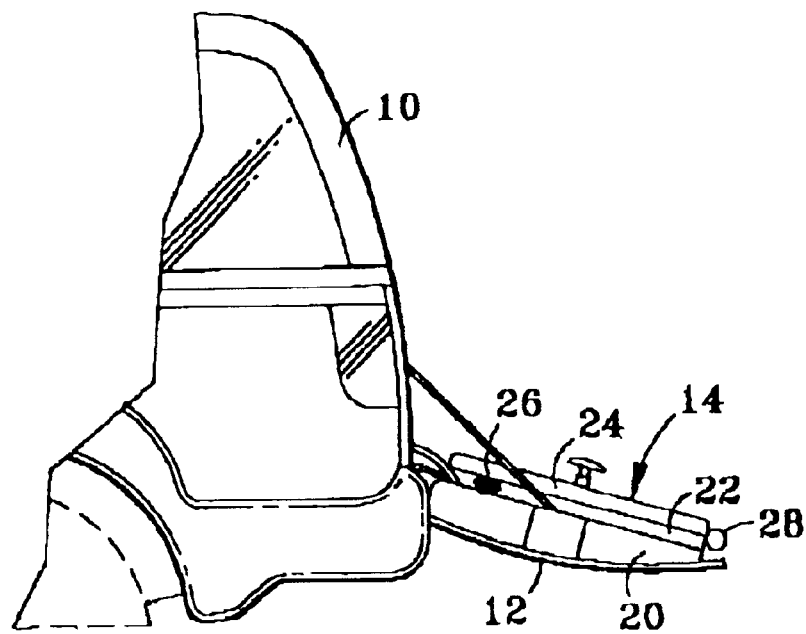
FIG. 2 is a side view of a vehicle tailgate in a ramp-assist position with the stowable load ramp being extended according to the present invention.

As shown in FIG. 2, the tailgate 12 can be lowered even further below the horizontal in order to serve as an integral part of the ramp 14 in vehicles where a suitable ramp angle cannot be achieved with the ramp 14 itself. The stowable load ramp 14 has aluminum upper and lower panels 22 and 24, respectively. The upper and lower panels 22 and 24 of the stowable load ramp 14 are attached to each other by a locking hinge 26 that allows 180 degrees of rotation, at which point the hinge 26 locks. The stowable load ramp 14 is attached to the inner surface 20 of the tailgate 12 via the upper panel 22 by a piano-type hinge 28.

Figure 3:
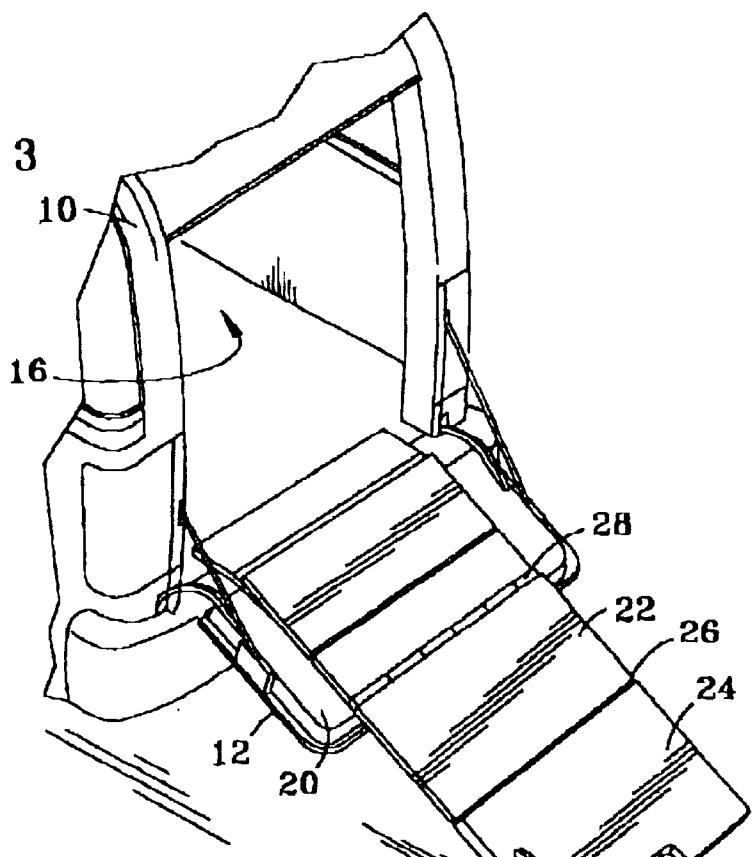
FIG. 3 is a perspective view of the stowable load ramp in its fully extended ramp position according to the present invention.

As further shown in FIG. 3, the stowable load ramp 14 is fully extended to serve as a ramp for loading cargo into the vehicle 10 using the tailgate 12 as part of the ramp 14. As seen here, the upper panel 22 of the stowable load ramp 14 is a predetermined degree narrower than the lower panel 24 such that it can nest within the lower panel 24 when in the stowed position.

Figure 4:
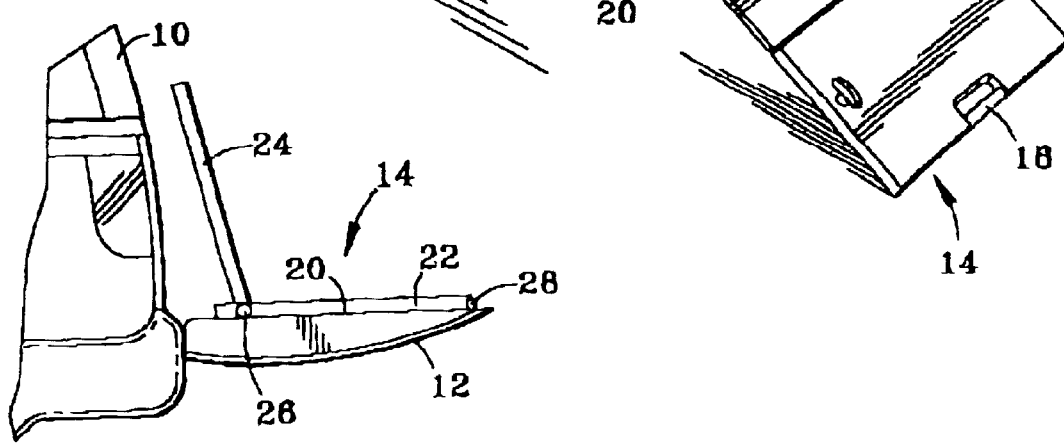
FIG. 4 is a side view of a vehicle tailgate in the horizontal position with the stowable load ramp in the seat back position according to the present invention.

In FIG. 4, the lower panel 24 of the stowable load ramp 14 can also serve as a seat back. From its stowed position, the lower panel 24 of the stowable load ramp 14 is raised to a substantially vertical position and locked into a position via the locking hinge 26 such that it functions as a seat back 32, creating a rear facing seating area at the rear of the vehicle 10. Such seating is intended for picnics and similar situations where the vehicle is parked.

Figure 5:
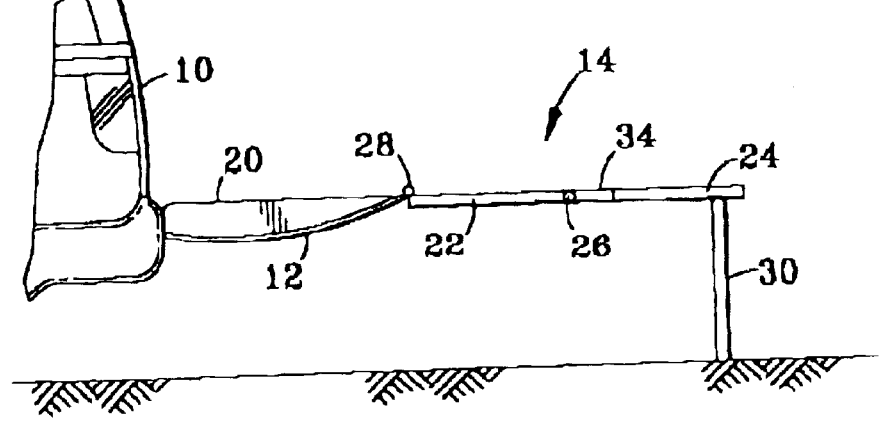
FIG. 5 is a side view of a vehicle tailgate in the horizontal position with the stowable load ramp in the table/work surface position according to the present invention.

In FIG. 5, foldable legs 30 allow the ramp 14 to function as a table or work surface 34 at the rear of the vehicle 10. This feature is also intended for picnics and similar situations where the vehicle is parked. The legs 30 are attached on the sides of the lower panel 24 of the stowable load ramp 14. The legs 30 fold centrally towards each other during storage and are contained within the upper and lower panels 22 and 24 of the stowable load ramp 14 when the ramp 14 is in the stowed position.

While only one embodiment of the stowable load ramp of the present invention has been described, others may be possible without departing from the scope of the following claims.

What is claimed is:

1. A stowable load ramp for a vehicle having an enclosed cargo area comprising:

a tailgate operable between a closed vertical position and an open horizontal position;

an upper panel hingedly attached to the tailgate;

a lower panel hingedly attached to the upper panel;

wherein when the tailgate is in the open horizontal position the upper and lower panels are operable between a stowed horizontal position and an extended downwardly angled ramp position;

wherein the lower panel is exposed to the enclosed cargo area, and serves as an interior trim panel when the panels are in a stowed position; and wherein the enclosed cargo area has a roof and is open to the passenger compartment of the vehicle.

2. The stowable load ramp as described in claim 1, wherein the upper panel is a predetermined degree narrower than the lower panel, and the panels nest together when in the stowed position.

3. The stowable load ramp as described in claim 1, wherein the lower panel has a handle.

4. A stowable load ramp for a vehicle having a planar cargo area comprising:

a tailgate operable between a closed vertical position and an open horizontal position;

an upper panel hingedly attached to the tailgate;

a lower panel hingedly attached to the upper panel;

wherein when the tailgate is in the open horizontal position the upper and lower panels are operable between a stowed horizontal position and an extended downwardly angled ramp position; and wherein the lower panel is positionable to a substantially vertical seat back position when the tailgate is in the open horizontal position and the upper panel is in the stowed horizontal position.

5. The stowable load ramp as described in claim 4, wherein the lower panel has a textured surface, thereby serving as the interior trim panel of the tailgate when in the stowed position.

6. The stowable load ramp as described in claim 4, wherein the upper panel is a predetermined degree narrower than the lower panel, and the panels nest together when in the stowed position.

7. The stowable load ramp as described in claim 4, wherein the lower panel has a handle.

8. A stowable load ramp for a vehicle having a planar cargo area comprising:

a tailgate operable between a closed vertical position and an open horizontal position;

an upper panel hingedly attached to the tailgate;

a lower panel, having legs that fold centrally towards each other so as to be contained within the lower panel when in a stowed position, hingedly attached to the upper panel; and wherein when the tailgate is in the open horizontal position the upper and lower panels are operable between a stowed horizontal position, an extended downwardly angled ramp position, and an extended horizontal work surface position when the foldable legs are extended.

9. The stowable load ramp as described in claim 8, wherein the lower panel has a textured surface, thereby serving as the interior trim panel of the tailgate when in the stowed position.

10. The stowable load ramp as described in claim 8, wherein the upper panel is a predetermined degree narrower than the lower panel, and the panels nest together when in the stowed position.

11. The stowable load ramp as described in claim 8, wherein the lower panel has a handle.

* * * * *